United States Patent [19]

Callahan et al.

[11] Patent Number: 4,634,502

[45] Date of Patent: Jan. 6, 1987

[54] PROCESS FOR THE REDUCTIVE DEPOSITION OF POLYOXOMETALLATES

[75] Inventors: James L. Callahan, Norwich, N.Y.; Michael J. Desmond, Cleveland Heights; Marc A. Pepera, Northfield Center, both of Ohio

[73] Assignee: The Standard Oil Company, Cleveland, Ohio

[21] Appl. No.: 769,557

[22] Filed: Aug. 26, 1985

Related U.S. Application Data

[63] Continuation-in-part of Ser. No. 667,843, Nov. 2, 1984, abandoned.

[51] Int. Cl.$^4$ .................... C25D 3/00; C25D 9/08; C25D 13/02
[52] U.S. Cl. .................................. 204/23; 204/181.5
[58] Field of Search ............... 204/23, 181.5, 181.4, 204/181.7

[56] References Cited

U.S. PATENT DOCUMENTS

| | | | |
|---|---|---|---|
| 3,577,324 | 5/1971 | Patterson | 204/20 |
| 3,616,280 | 10/1971 | Arnold | 204/14 N |
| 3,703,446 | 11/1972 | Haycock et al. | 204/23 |
| 4,092,223 | 5/1978 | Kaufman | 204/23 |
| 4,222,828 | 9/1980 | Zuurdeeg | 204/16 |
| 4,225,322 | 9/1978 | Morcos | 252/447 |
| 4,272,333 | 6/1981 | Scott et al. | 204/23 |
| 4,292,144 | 9/1981 | Lepetit et al. | 204/23 |
| 4,411,742 | 10/1983 | Donakowski et al. | 204/16 |

Primary Examiner—Howard S. Williams
Attorney, Agent, or Firm—Sue E. McKinney; Joseph G. Curatolo; Larry W. Evans

[57] ABSTRACT

A process for the reductive deposition of polyoxometallate complexes on supports. The process includes the steps of forming a solution of at least one polyoxometallate compound in a solvent, said compound having the formula $A_a(L_lM_mJ_zO_y)$, adding a quantity of a support material having electronic conductivity to the solution, charging the solution containing the support material to an electrolytic cell in contact with the cathode thereof, the cell having a separate compartment for the anode, passing a current of from about 0.1 to about 500 mA/cm$^2$ of electrode area through the cell whereby the support material receives a deposit of a polyoxometallate wherein the average oxidation state of the metals therein has been reduced to a valence greater than zero and, thereafter separating and recovering the support material carrying the reduced metallate complex.

11 Claims, No Drawings

PROCESS FOR THE REDUCTIVE DEPOSITION OF POLYOXOMETALLATES

CROSS-REFERENCE TO RELATED APPLICATION

This application is a continuation-in-part of U.S. Ser. No. 667,843, filed Nov. 2, 1984, now abandoned.

TECHNICAL FIELD

The process of the present invention produces reduced heteropolyoxoanion complexes with simultaneous dispersion thereof on high surface area supports comprising conductors or semiconductors. The process is superior to impregnation processes inasmuch as counter ion incorporation will be minimized and, for processes where reduced materials are desired, no post preparation reduction step is required. The resulting reduced complexes are suitable as catalysts, such as for carbon monoxide reduction, hydrocarbon oxidation or dehydrosulfurization reactions, or as electrode materials in energy storage devices, such as batteries or capacitors.

BACKGROUND ART

Various methods for the preparation of highly dispersed metals in a zero valence state have been established and widely used for the preparation of catalysts. One of the most common is the impregnation of a metal salt onto a support followed by high temperature reduction to the metallic state. However, the temperatures required for reduction often lead to sintering of the metal and can sometimes degrade the support.

Reduced metals can also be electrodeposited onto supports. U.S. Pat. No. 4,115,322 describes such a process whereby a thin film of a noble metal or alloy thereof, or silver, or an alloy of noble metals and silver or nickel is electrodeposited on a nonporous pyrolytic graphite surface. The process employs a salt of the noble metal and a complexing agent. The materials which result are electrochemical catalysts said to be useful in processes including oxygen adsorption, oxygen and hydrogen evolution, oxide formation and oxygen reduction.

Another U.S. Pat. No. 4,411,742, describes the electrolytic deposition of zinc and graphite onto metal items such as fasteners to impart a corrosion resistant surface having a low coefficient of friction. The codeposit is applied by immersing the metal substrate in an acidic zinc plating bath containing insolubilized bulk graphite.

U.S. Pat. No. 3,703,446 relates to fluidized bed electrolytic cells which can produce homogeneous metal powders and powders with layers of different metals. The patent discloses that, for example, a catalyst could be manufactured by electroplating a thin film of platinum or gold onto finely divided conductive particles such as carbon.

U.S. Pat. No. 3,577,324 also discloses a process for coating particles with metals. No specific chemistry is claimed but rather an apparatus and accompanying process that allows particles as small as 10 microns to be uniformly coated without an accumulation of gas generated from the plating reaction on the surface to interfere with the deposition of particles.

Thus, none of the foregoing art has disclosed a process for the reductive deposition of heteropolyoxoanion complexes onto supports wherein the reduced, deposited materials are not reduced to their metallic state.

DISCLOSURE OF THE INVENTION

In general, the process for the reductive deposition of polyoxometallate complexes on supports includes the steps of forming a solution of at least one polyoxometallate compound in a solvent, said compound having the formula

$$A_a(L_lM_mJ_zO_y)$$

wherein

A is at least one ion selected from the group consisting of hydrogen, one or more of the Group IA to VIIIA or Group IB to VIIB metals, one or more of the rare earth metals or actinides, ammonium, alkyl ammonium, alkyl phosphonium and alkyl arsonium, or a mixture of two or more thereof;

L is selected from the group consisting of hydrogen and one or more of the Group IIIB to VIIB elements;

M is at least one metal selected from the group consisting of one or more of the Group IA to IVA and VIIA to IIB metals, the rare earths and actinides;

J is at least one metal selected from the group consisting of one or more of the Group VA and VIA metals;

a is a number which when multiplied by the valence of A will result in balancing the charge on the complex within the parentheses;

l is a number ranging from zero to about 20;

m is a number ranging from zero to about 20;

z is a number ranging from about 1 to about 50; and y is a number ranging from about 7 to about 150;

adding a quantity of a support material to the solution, charging the solution containing the support material to an electrolytic cell in contact with the cathode thereof, the cell having a separate compartment for the anode, passing a current of from about 0.1 to about 500 mA per $cm^2$ of electrode surface through the cell whereby the support material receives a deposit of a polyoxometallate wherein the average oxidation state of the metals therein has been reduced to a valence greater than zero and, thereafter separating and recovering the support material carrying the reduced metallate complex.

PREFERRED EMBODIMENT FOR CARRYING OUT THE INVENTION

The process of the present invention is practiced by the deposition of various metal containing compounds onto a support material. Deposition is accomplished electrolytically as contrasted to impregnation of a support. The invention is based in part upon the use of a conducting support material in a solution of the material being deposited in which environment the conducting support material becomes an extension of the normal cathode out into the solution. Any support particles in contact with the cathode directly or through other particles will become the cathode so that insoluble reduced metal containing species, e.g., reduced oxides, will be electrodeposited thereon. Rapid agitation of the solution will make and break electrical contacts thereby quickly enabling a high dispersion of the metal containing species over many particles of support. Favorably, it will tend to prevent the growth of large aggregates. By forming a thin coating of the metal over a large surface area support material, the use of expensive metals is most efficient.

The process is practiced for supporting polyoxometallate complexes such as tungstates, molybdates, vanadates, and the like as well as combinations thereof. Elements preferred for reduction in these complexes include those of Group VA, vanadium, niobium and tantalum and Group VIA, chromium, molybdenum and tungsten of the Periodic Table. None of these metals are reduced to the zero valence state in the process, that is, they are not deposited as free metals but rather as reduced polyoxometallate complexes.

More particularly, with respect to the polyoxometallate formula $A_a(L_lM_mJ_zO_y)$ provided hereinabove, a preferred range of the various elements and respective amounts is as follows:

L is P, As, Si, Al, H, Ge, Ga, B or a mixture of two or more thereof;

M is Zn, Ti, Mn, Fe, Co, Ni, Rh, Zr, Re or a mixture of two or more thereof;

J is Mo, W, V or a mixture of two or more thereof;

l is a number ranging from zero to about 4;

m is a number ranging from zero to about 6;

z is a number ranging from about 6 to about 24;

y is a number ranging from about 18 to about 80; and a remains the same.

Insofar as the support materials are concerned, these must have electronic conductivity, i.e., either conductors or semiconductors, the latter having a resistance of less than 100 ohm-cm, and including materials such as ferrites and intermetallic compounds. Conducting materials such as carbon or graphite are preferred.

The support material, finely divided so as to provide a large surface area, is colloidally dispersed in the electrolyte medium of the cathode compartment of an electrolytic cell. Particle size of the support material can range from about 0.01 to about 50 microns. As stated briefly hereinabove, electrochemical reductions may take place on the surface of the support particles as they contact the cathode, directly or indirectly, becoming extensions thereof.

In order to deposit the metals disclosed herein as metallate complexes, an electrolytic cell is employed comprising a cathode and an anode, both being either copper or other material inert to the process. The anode is placed in an isolated compartment such as a cylindrical enclosure electrically contacting one catholyte solution through an interface such as an ion exchange resin membrane, e.g., Nafion ®, or sintered glass frit or salt bridge. Nafion ® is a sulfonic acid functionalized ion exchange resin. Into the anode compartment is placed an electrolyte solution such as alkali metal halides, nitrates, acetates, sulfates, perchlorates, hydroxides and the like as well as mineral acids. The remainder of the cell will contain a solution of the compounds to be deposited as metallates and a quantity of finely divided carbon or graphite or other support, all of which can contact the cathode.

The membrane material employed to isolate the anode compartment from the cathode compartment must be impermeable to the size of the suspended support particles. By providing such a barrier, the suspended substrate material is prevented from contacting the anode, otherwise oxidation of the positive metallates would occur causing re-dissolution in the electrolyte solution.

There are several parameters which are variable and will, in turn, affect preparation of the supported compounds. As one, a wide variety of aqueous solvents may be employed having a pH range of from about 0.1 to 7. Hydrochloric acid is typical of said aqueous electrolytes and is exemplified hereinbelow. The foregoing recitation is exemplary only and should not be construed as limiting it being understood that a large number of aqueous solvents could be employed.

The amount of metal deposited as a metallate can also be varied by adjusting the precursor salt concentration, voltage, current density, electrolysis time and type of support material. Salt concentrations can range from about 0.01 to five molar. The extent and dispersion of the deposit can also be effected by the precursor salt itself. Weakly coordinating counter ions are believed to be the most desirable and these include halides, nitrates, sulfates, perchlorates and acetates.

Regarding voltage, a useful range is from about 0.1 to 20 volts. Current density is from about 0.1 to 500 $mA/cm^2$ based on the fixed cathode and similarly electrolysis time can vary between about 0.1 to 100 minutes. As to the type of support materials, these have been noted hereinabove as were the range of particle sizes.

Another factor influencing deposition is the stir rate of the precursor salt solution in the cell, with rapid agitation contributing to fine, thin layer depositions of metallate on individual support particles. Once deposition is complete as evidenced by a drop in the current within the cell, the solution is filtered and the coated support particles are then washed and dried for use.

In the work which is reported next, two different supported catalysts were prepared in a two-electrode cell as described hereinabove. The type of electrode has been specified in each instance as has the separator in the anode compartment.

EXAMPLE NO. 1

A carbon supported tungsten catalyst was prepared by dissolving 15 g of phosphotungstic acid $(H_3PW_{12}O_{40} \cdot xH_2O)$ in 300 cc of 1 M HCl solution to which was added 15 g high surface area carbon powder ($>500$ $m^2/g$). Platinum electrodes were used and the anode and cathode separated by a tipped glass tube which was filled with HCl as the electrolyte. Only the cathode compartment contained the heteropolyacid and the carbon. The cathode solution was vigorously stirred and a current of about 100 mA resulted at an applied potential of 17 V. Concentrated HCl was added dropwise periodically to maintain the current near 100 mA. After 9 hours the carbon was filtered and washed with water thoroughly. The carbon was then dried under vacuum at about 110° C. The carbon was analyzed to contain 19 weight percent tungsten as the tungstate complex.

EXAMPLE NO. 2

A carbon supported molybdenum catalyst was prepared by following the same procedure as in Example No. 1 except 15 g of phosphomolybdic acid was used $(H_3PMo_{12}O_{40} \cdot xH_2O)$. The current drawn at 17 V ranged from 500 to 100 mA. The recovered carbon contained 14 weight percent molybdenum as the molybdate complex.

The reduced polyoxometallate modified high surface area materials prepared by the process may find use as heterogeneous catalysts for hydrocarbon oxidation reactions, synthesis gas reactions involving CO reduction, or hydrodesulfurization reactions. Additionally, the materials may be utilized as electrodes in energy storage devices such as batteries or capacitors.

Thus, it should be apparent to those skilled in the art that the process of the subject invention is operable with a variety of conductor and semiconductor support materials other than carbon particles to support the polyoxometallate complexes disclosed herein. Similarly, parameters for the deposition of the various polyoxometallates such as discussed herein including concentrations, solvent selection, voltage, current density, electrolysis time and others that are within the skill of the art, can be varied from those which have been exemplified. It is to be understood that these variables fall within the scope of the claimed invention and that the subject invention is not to be limited by the examples set forth herein. These have been provided merely to demonstrate operability and, therefore, the selection of specific precursor catalyst components and process conditions can be determined without departing from the spirit of the invention herein disclosed and described. Moreover, the scope of the invention shall include all modifications and variations that may fall within the scope of the attached claims.

We claim:

1. A process for the reductive deposition of polyoxometallate complexes on supports comprising the steps of:
    forming a solution of at least one polyoxometallate compound in a solvent, said compound having the formula $$A_a(L_l M_m J_z O_y)$$

wherein
    A is at least one ion selected from the group consisting of hydrogen, one or more of the Group IA to VIIIA or Group IB to VIIB metals, one or more of the rare earth metals or actinides, ammonium, alkyl ammonium, alkyl phosphonium and alkyl arsonium, or a mixture of two or more thereof;
    L is selected from the group consisting of hydrogen and one or more of the Group IIIB to VIIB elements;
    M is at least one metal selected from the group consisting of one or more of the Group IA to IVA and VIIA to IIB metals, the rare earths and actinides;
    J is at least one metal selected from the group consisting of one or more of the Group VA and VIA metals;
    a is a number which when multiplied by the valence of A will result in balancing the charge on the complex within the parentheses;
    l is a number ranging from zero to about 20;
    m is a number ranging from zero to about 20;
    z is a number ranging from about 1 to about 50; and
    y is a number ranging from about 7 to about 150;
    adding a quantity of a support material to said solution;
    charging said solution containing said support material to an electrolytic cell in contact with the cathode thereof said cell having a separate compartment for the anode;
    passing a current of from about 0.1 to about 500 mA/cm$^2$ of electrode area through said cell whereby said support material receives a deposit of a polyoxometallate wherein the average oxidation state of the metals therein has been reduced to a valence greater than zero; and
    thereafter separating and recovering said support material carrying said reduced metallate complex.

2. A process, as set forth in claim 1, wherein said solvent is selected from the group consisting of aqueous electrolytes having a pH from at least about 0.1 to about 7.

3. A process, as set forth in claim 2, wherein said aqueous electrolyte is HCl.

4. A process, as set forth in claim 2, wherein said metallate is based on the metal tungsten, said solvent is hydrochloric acid and said support is carbon.

5. A process, as set forth in claim 2, wherein said metallate is based on the metal molybdenum, said solvent is hydrochloric acid and said support is carbon.

6. A process, as set forth in claim 2, wherein said metallate is based on the metal vanadium, said solvent is hydrochloric acid and said support is carbon.

7. A process, as set forth in claim 1, wherein said support material is selected from the group consisting of conductors and semiconductors having a resistance less than 100 ohm-cm.

8. A process, as set forth in claim 7, wherein said semiconductors comprise ferrites and intermetallic compounds.

9. A process, as set forth in claim 7, wherein said support material comprises activated carbon having a particle size of at least about 0.1 microns and is colloidally dispersed in said solution.

10. A process, as set forth in claim 1, wherein said anode is placed in an isolated compartment electrically contacting one catholyte solution through an interface.

11. A process, as set forth in claim 1, wherein said step of passing a current includes the step of agitating said solution containing said support material.

* * * * *